United States Patent [19]

Takeda et al.

[11] Patent Number: 5,469,319
[45] Date of Patent: Nov. 21, 1995

[54] MAGNETIC TAPE CASSETTE HAVING TAPE EDGE REGULATING MEMBERS

[75] Inventors: Hidekazu Takeda, Fujisawa; Nobuyuki Kaku, Kanagawa; Kenji Ogiro, Yokohama, all of Japan

[73] Assignee: Hitachi, Ltd., Tokyo, Japan

[21] Appl. No.: 262,385

[22] Filed: Jun. 20, 1994

Related U.S. Application Data

[63] Continuation of Ser. No. 6,943, Jan. 21, 1993, abandoned.

[30] Foreign Application Priority Data

Jan. 22, 1992 [JP] Japan .................................. 4-009436

[51] Int. Cl.⁶ ............... G03B 1/04; G11B 15/32; G11B 23/04
[52] U.S. Cl. ........................... 360/132; 242/346
[58] Field of Search ................... 360/132; 242/195, 242/197, 199, 346, 346.1, 346.2; 206/387; 226/196, 197, 198, 199; 352/72

[56] References Cited

U.S. PATENT DOCUMENTS

| | | | |
|---|---|---|---|
| Re. 28,863 | 6/1976 | Schaeffer et al. | 242/199 |
| 3,833,185 | 9/1974 | Talavera | 360/132 |
| 4,371,131 | 2/1983 | Okamura et al. | 242/199 |
| 4,466,582 | 8/1984 | Shiba | 242/197 |
| 4,575,023 | 3/1986 | Komiyama et al. | 242/199 |
| 4,736,904 | 4/1988 | Schuettle et al. | 242/199 |
| 5,034,839 | 7/1991 | Okamura et al. | 360/132 |
| 5,229,906 | 7/1993 | Katagiri et al. | 360/132 |

FOREIGN PATENT DOCUMENTS

| | | | |
|---|---|---|---|
| 0243877 | 4/1987 | European Pat. Off. | |
| 0394780 | 4/1990 | European Pat. Off. | |
| 2224831 | 10/1974 | France | 360/132 |
| 2143870 | 3/1973 | Germany | 360/132 |

OTHER PUBLICATIONS

Patent Abstracts of Japan, vol. 9, No. 329, Dec. 24, 1985 No. 60-154 375—Nippon Victor K.K.

*Primary Examiner*—Stuart S. Levy
*Assistant Examiner*—William J. Klimowicz
*Attorney, Agent, or Firm*—Antonelli, Terry, Stout & Kraus

[57] ABSTRACT

A magnetic tape cassette having tape reels on which a magnetic tape is wound, includes magnetic tape regulating members one end portion of which is securely fixed on the magnetic tape cassette, with other portions being in contact with edge portions of the magnetic tape so as to regulate side edge alignment of the magnetic tape in the magnetic tape cassette.

2 Claims, 1 Drawing Sheet

MAGNETIC TAPE CASSETTE HAVING TAPE EDGE REGULATING MEMBERS

This application is a Continuation of application Ser. No. 08/006,943 filed Jan. 21, 1993, now abandoned.

BACKGROUND OF THE INVENTION

The present invention relates to a magnetic tape cassette including tape reels on which a magnetic tape is wound and, more particularly, to a holding structure of a magnetic tape which is suitable for reducing the size and improved reliability.

Conventionally, as disclosed in, for example, Japanese Patent Unexamined Publication No. 60-154375, in order to reduce the size of a magnetic tape cassette, flanges of tape reels are eliminated, and a supply reel and a take-up reel are located in such a manner that their maximum winding diameters overlap each other, thereby decreasing a pitch between the reels. Thus, it is possible to decrease the plane area and the height of the magnetic tape cassette. In this type of cassette, sheet-like members are inserted between a casing and the magnetic tape so as to prevent side edge misalignment of the magnetic tape which is caused by absence of flanges.

A tape cassette wherein no flanges are formed on tape reels involves problems in relation to side edge alignment of a magnetic tape. That is to say, levels of side edges of the magnetic tape wound on the reel become irregular, and levels of side edges of the magnetic tape with respect to a tape moving system of the apparatus are not constant. In order to solve these problems, the above-mentioned method of inserting sheet-like members is employed; however, the sheet-like members and the magnetic tape always slide on each other so that edges of the magnetic tape are likely to be damaged. Moreover, the sheet-like members are located in such a manner that gaps of predetermined distances are defined between the sheet-like members and the casing of the tape cassette, and, consequently, levels of side edges of the magnetic tape with respect to the tape cassette can not be precisely determined. If a deviation is caused between the level of the magnetic tape and the level of the tape moving system of the apparatus, movement of the magnetic tape becomes unstable, so that reliable track tracing can not be conducted, and that the tape will be easily damaged by flanges of tape guides or the like, thereby deteriorating the quality of reproduced images.

SUMMARY OF THE INVENTION

It is therefore an object of the present invention to provide a small-sized tape cassette in which contact between edges of a magnetic tape and components of the tape cassette can be decreased, and levels of side edges of the magnetic tape in the tape cassette can be precisely determined.

In order to achieve this object, according to the invention, there are provided members for determining side edge levels of the magnetic tape in the tape cassette and exerting predetermined pressing forces on edges of the magnetic tape.

Each pair of the magnetic tape pressing members has one end secured on the tape cassette, and portions of the pressing members at a predetermined distance from the secured ends are positioned to be predetermined distances away from edge portions of the magnetic tape by means of a stopper provided on the tape cassette. Consequently, the magnetic tape pressing members can be positioned with respect to the tape cassette, and also, they can produce predetermined forces. By aligning the side edge levels of the magnetic tape wound on a supply reel and a take-up reel with the levels defined by the magnetic tape pressing members, the side edge levels of the magnetic tape wound on each reel can be maintained accurately with respect to the tape cassette, and even if a disturbance to change the side edge levels of the magnetic tape is caused, it is possible to maintain the magnetic tape at a predetermined position and to effect the side edge alignment by the forces of the pressing members.

DETAILED DESCRIPTION OF THE PREFERRED EMBODIMENT

The preferred embodiment of the present invention will be hereinafter described with reference to the attached drawings.

Figure 1:
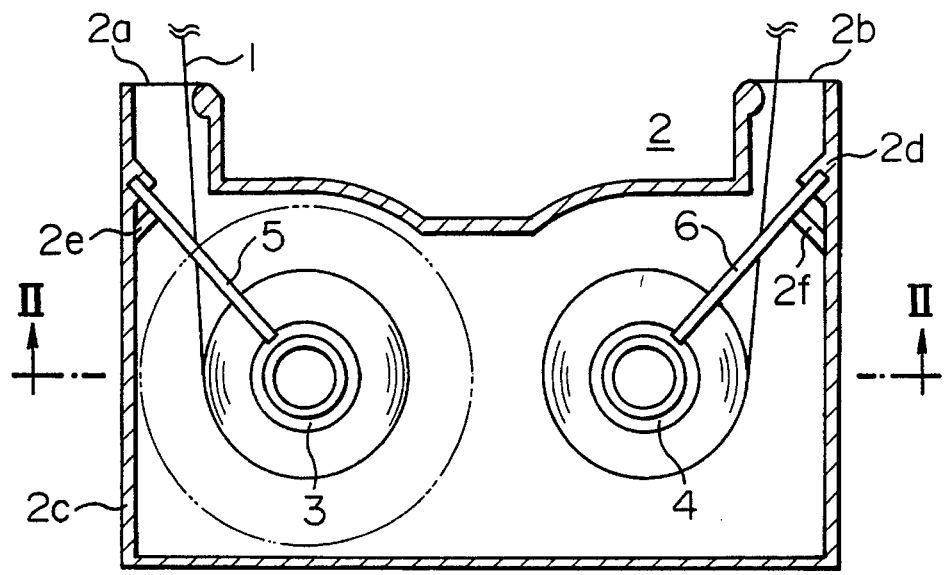
FIG. 1 is a plan view of one embodiment of a magnetic tape cassette according to the present invention.

As shown in FIG. 1, a magnetic tape 1 is wound on the outer periphery of a supply reel hub 3 and a take-up reel hub 4 provided in a cassette 2, with the tape being at a predetermined level to be spaced from walls of the cassette at a predetermined distance. The magnetic tape 1 is extended out of the cassette 2 through a supply side opening 2a and a take-up side opening 2b of the cassette 2.

As shown in FIG. 1, the cassette 2 is provided with pressing members 5 having a cylindrical cross-sectional shape. The pressing members 5 are mounted at one end on the cassette 2, extending from a portion of the side wall adjacent to the supply side opening 2a toward the supply reel hub 3. The end portions or proximal ends of the pressing members 5 are press-fitted and retained on a predetermined position of a cassette casing side wall 2c, and the other end portions of the pressing members 5 serve to regulate side edge alignment of the magnetic tape 1. Also, on the take-up side of the cassette 2, additional pressing members 6 are provided on a predetermined position of a cassette casing side wall 2d in substantially the same manner as on the supply side. Further, positioning members 2e and 2f for the pressing members 5 and 6 are integrally formed on the cassette casing side walls 2c and 2d, respectively.

Figure 2:
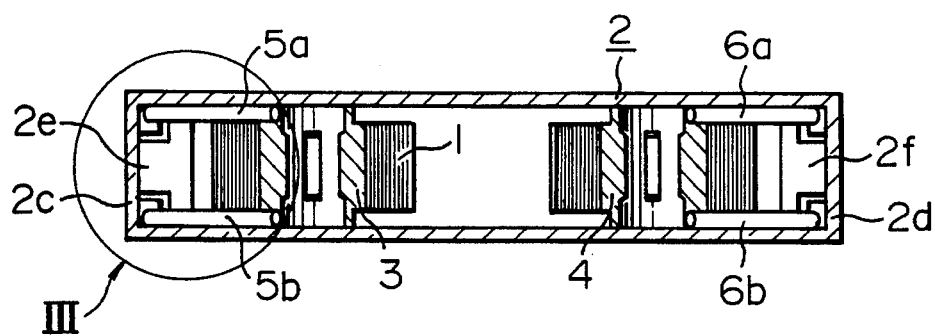
FIG. 2 is a cross-sectional view taken along the line II—II of FIG. 1.

Each pair of the pressing members 5a, 5b or 6a, 6b as shown most clearly in FIG. 2 is located in spaced relation to clamp the magnetic tape 1 therebetween, thereby maintaining the magnetic tape 1 at a predetermined position and effecting the side edge alignment.

Figure 3:
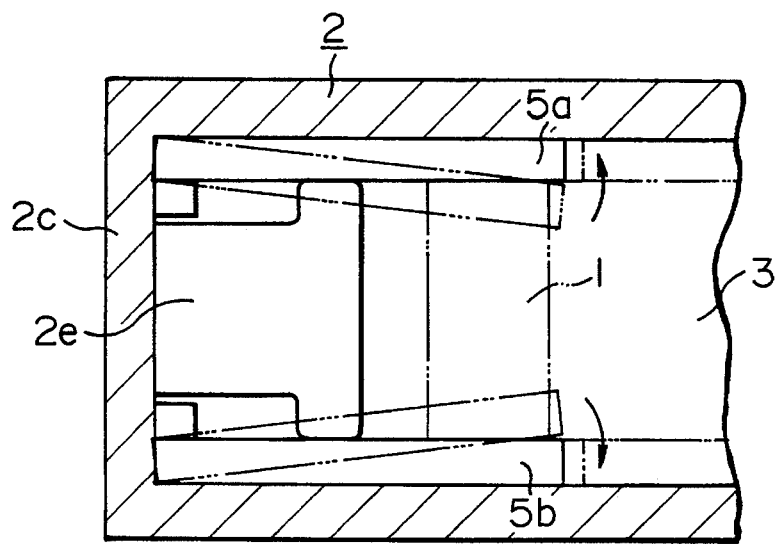
FIG. 3 is an enlarged cross-sectional view of the portion III of FIG. 2.

In FIG. 3, the pressing members 5 of the magnetic tape 1 comprise the pressing member 5a for regulating the upper edge alignment of the tape and a pressing member 5b for regulating the lower edge alignment of the tape. The pressing members 5a and 5b are attached to the cassette casing so as to be elastically deformable in directions for restricting the width of the magnetic tape 1, as indicated by dashed lines in FIG. 3. In this case, the positioning member 2e serves to maintain the gap between the pressing members 5a and 5b at substantially the same distance as the tape width, thus preventing the magnetic tape from being restricted by an excessive force.

According to the invention, as described above, the side edge alignment of the magnetic tape can be maintained constantly even when the reels having no flanges, so that edges of the tape can be prevented from being damaged due to side edge misalignment.

As clearly understood from the above description, the magnetic tape cassette of the present invention is effective to prevent tape damages such as tape edge folding caused by side edge misalignment of the tape in the cassette.

The above-described embodiment of the invention can be modified or altered without deviating from the spirits and main characteristics of the invention. Therefore, this embodiment, which is a mere example of the present invention in every aspect, should not be interpreted in a limited manner. The scope of the invention is described in the scope of claim for a patent. Moreover, modifications and alterations within the scope of claim for a patent are all within the present invention.

What is claimed is:

1. A magnetic tape cassette adapted to be mounted on a magnetic recording/reproducing apparatus, for recording of signals on a magnetic tape contained in the cassette or reproducing of signals from the magnetic tape, said magnetic tape cassette comprising:

a cassette body casing; first and second cylindrical hub members, each cylindrical hub member rotatably mounted in said cassette body casing for rotation about an axis perpendicular to a bottom surface of said cassette body casing; a magnetic tape wound on an outer periphery of each of said cylindrical hub members to form first and second tape reels thereon, with each tape reel including from zero to a plurality of turns of tape, each tape reel having a top edge surface and a bottom edge surface, adjacent a top surface and said bottom surface of said cassette body casing, respectively; said cylindrical hub members being adapted to, when said magnetic tape cassette is mounted on said magnetic recording/reproducing apparatus, be engaged with tape take-up shafts of said apparatus to drive said hub members and wind said magnetic tape from one of said tape reels to the other of said tape reels; and first and second tape regulating means, each tape regulating means including a top and a bottom elongated rod member; each rod member having a proximal end securely attached to said cassette body casing, an elongated portion statically extending radially across an adjacent one of said tape reels and in line contact with the adjacent edge surface of all the turns of the tape of said adjacent one of said tape reels over the entire radius of said adjacent one of said tape reels, and a distal end overlapping an edge portion of the cylindrical hub member of said adjacent one of said tape reels, to maintain said top edge surface and said bottom edge surface of said tape reels at substantially constant levels in said magnetic tape cassette so as to minimize deviations of the turns of the tape from said top edge surface and said bottom edge surface.

2. A magnetic tape cassette according to claim 1, wherein each one of said tape regulating means includes a stopper member securely fixed on said cassette body casing and contacting the top and bottom rod members of said one of said tape regulating means at a predetermined distance from said proximal ends thereof to restrict said top and bottom rod members from movement toward said top and bottom edge surfaces of said magnetic tape reels, while allowing said top and bottom rod members to be in line contact with said top and bottom edge surfaces, respectively, of said magnetic tape to regulate the alignment of said magnetic tape in said magnetic tape cassette.

* * * * *